United States Patent [19]

Saito

[11] Patent Number: 4,761,034

[45] Date of Patent: Aug. 2, 1988

[54] HEAD REST UNIT

[75] Inventor: Tetsuo Saito, Tokyo, Japan

[73] Assignee: Tachikawa Spring Co., Ltd., Japan

[21] Appl. No.: 5,317

[22] Filed: Jan. 16, 1987

Related U.S. Application Data

[63] Continuation of Ser. No. 671,297, Nov. 14, 1984, abandoned.

[51] Int. Cl.$^4$ .................................................. A47C 7/38
[52] U.S. Cl. .................................... 297/408; 297/409; 297/410
[58] Field of Search ......................... 297/408, 409, 410

[56] References Cited

U.S. PATENT DOCUMENTS

| 186,156 | 1/1877 | Parker | 297/408 X |
| 318,368 | 5/1885 | Gitt | 297/408 |
| 848,001 | 3/1907 | Berninghaus | 297/409 X |
| 4,304,439 | 12/1981 | Terada et al. | 297/408 X |
| 4,353,595 | 10/1982 | Kaneko et al. | 297/408 |

FOREIGN PATENT DOCUMENTS

| 2646613 | 4/1978 | Fed. Rep. of Germany | 297/408 |
| 2266476 | 4/1975 | France | 297/408 |

Primary Examiner—Francis K. Zugel
Assistant Examiner—Laurie K. Cranmer
Attorney, Agent, or Firm—Darby & Darby

[57] ABSTRACT

A head rest unit for use in a vehicle seat includes a head rest stay, a main frame pivotally fixed to the head rest stay, and an auxiliary frame pivotally fixed to the front outer surface of the main frame. A linking mechanism is arranged between the main frame and auxiliary frame so as to permit the auxiliary frame to pivot away from the main frame and towards the occupant's head when the head rest is inclined.

3 Claims, 3 Drawing Sheets

FIG. 1
PRIOR ART
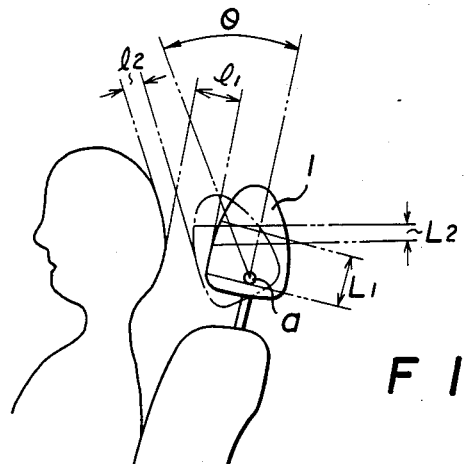
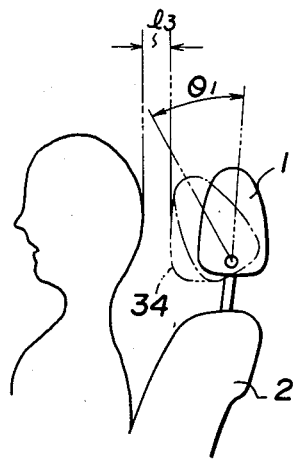
FIG. 2
FIG. 3
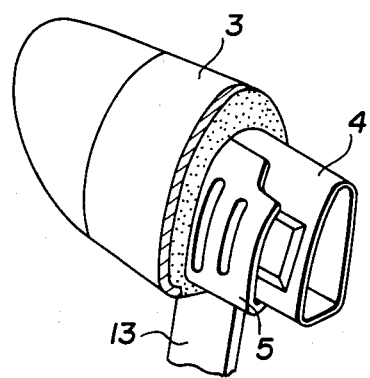

HEAD REST UNIT

This is a continuation of application Ser. No. 671,297 filed Nov. 14, 1984 now abandoned.

BACKGROUND OF THE INVENTION

1. Field of the Invention

The present invention relates to a head rest unit for use in a vehicle seat, and in particular relates to a head rest unit which is capable of adjusting its inclination in a forward and backward direction with respect to the seat.

2. Description of the Prior Art

In the conventional head rest unit of this type, there has been produced such head rest unit as exemplarily shown in FIG. 1 of the accompanying drawings. According to this prior art, the head rest (1) is selectively rotatable about the point (a) within the range from the position indicated in solid line up to that indicated in the one-dotted line, thus it is possible to incline the head rest at a desired angle within the angle range of $\theta$.

However, the above-mentioned conventional head rest unit is disadvantageous in that, when the head rest (1) is inclined forwardly toward the head of an occupant (i.e. the distance between the head rest (1) and the head of the occupant is changed from $l_1$ to $l_2$), then the contact area ($L_1$) defined by the contact of the occupant's head with the head rest (1) will be reduced to that indicated by ($L_2$), resulting in an extremely narrow contact area. Consequently, such structure of the conventional head rest unit does not provide a good support for the occupant's head.

OBJECT AND SUMMARY OF THE INVENTION

The present invention is designed to eliminate the aforementioned disadvantages of the conventional head rest unit.

Accordingly, it is a primary object of the present invention to provide a head rest unit which maintains the same size of contact area between the occupant's head and the head rest for different head rest positions, thus allowing the occupant's head to be kept in a full contact with the head rest, regardless of the inclination of the head rest, so that the occupant can enjoy a feeling of good, comfortable support.

To accomplish the above object, the present invention comprises a head rest stay mounted supportingly on a vehicle seat or the like, a main frame pivotally fixed to the head rest stay, an auxiliary frame pivotally fixed to the front outer surface of the main frame, and a linking mechanism for causing the auxiliary frame to move forwardly of the main frame in cooperation with the forward inclination of the main frame, whereby the auxiliary frame is moved in a position to sufficiently support the occupant's head in simultaneous response to the inclination of the head rest. Therefore, the size of the contact area between the occupant's head and the front outer surface of the head rest remains the same, regardless of the inclination of the head rest.

In one aspect of the present invention, the linking mechanism comprises a relatively small number of components or parts. Accordingly, in comparison with a head rest of such type wherein the head rest is movable in a direction horizontal to a stay for the same object of the present invention, the linking mechanism of the present invention requires fewer number of components or parts, which reduces the weight of the head rest and its manufacturing costs.

BRIEF DESCRIPTION OF THE DRAWINGS

FIG. 1 is a diagram of a conventional head rest unit;

FIG. 2 is a diagram showing one embodiment of a head rest unit according to the present invention;

FIG. 3 is a partially sectional perspective view showing one part of the head rest unit shown in FIG. 2;

DETAILED DESCRIPTION OF THE PREFERRED EMBODIMENTS

FIG. 2 shows a state in which a head rest unit (1) according to the present invention is fixed to a vehicle seat. The structure of such head rest unit (1) is partially shown in FIG. 3, in which a main frame (4) and an auxiliary frame (5) are enclosed in upholstery (3).

Figure 5:
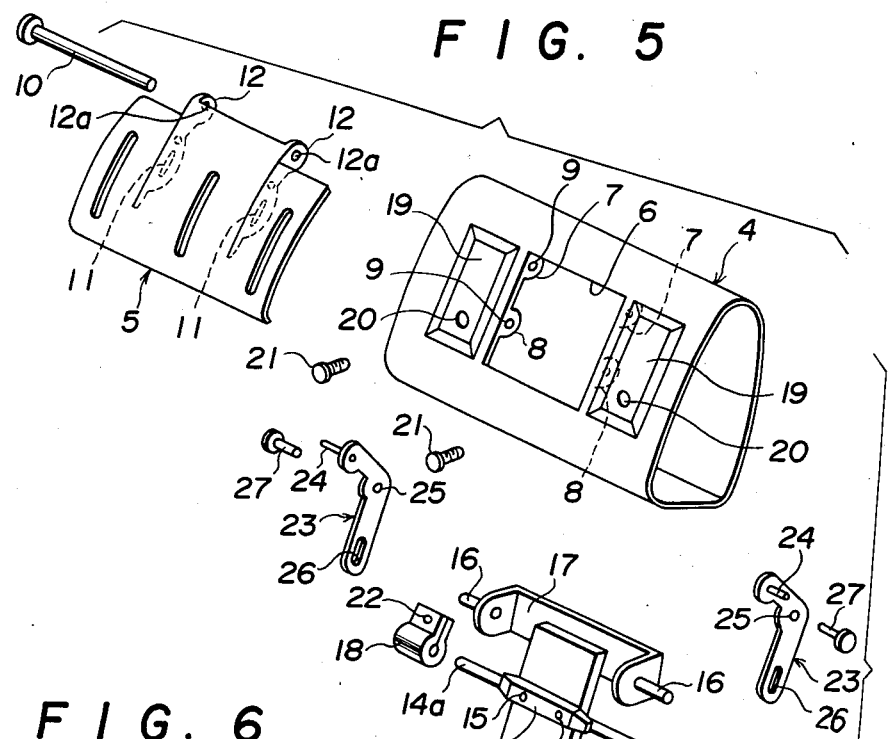
FIG. 5 is an exploded perspective view of the head rest unit shown in FIG. 2.
Figure 4:
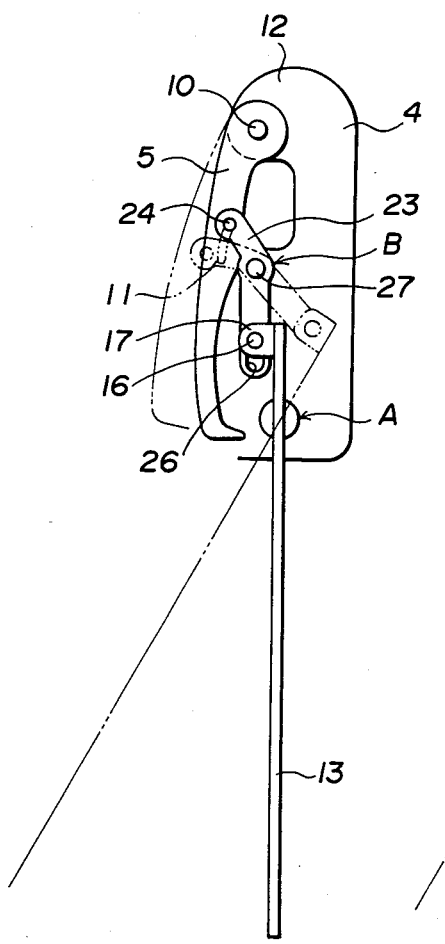
FIG. 4 is a side view of the linking mechanism of the head rest unit shown in FIG. 2.

In FIG. 4 and FIG. 5, the main and auxiliary frames (4) and (5) are respectively composed of the parts shown therein. Specifically, the main frame (4) is formed substantially in the shape of a triangle in section. On the front outer surface of the main frame (4) is formed a rectangular opening (6) which has a pair of supporting portions (7) and a pair of lower supporting portions (8) each projecting inwardly of the main frame (4). A hole (9) is formed in each of the supporting portions (7) (8).

The auxiliary frame (5) is formed in a curved shape, which has a pair of pivotal fixing portions (12) projecting and extending longitudinally on the inner surface of frame (5). Formed in each of the pivotal fixing portions (12) are round holes (12a) and holes (11). The auxiliary frame (5) is swingably, pivotally fixed to the main frame (4) in such a manner that the auxiliary frame (5) is disposed on the front outer surface of the main frame (4), and a pin (10) is inserted through the holes (12a) of the pivotal fixing portions (12) and through the holes (9) of the supporting portions (7) so that the pivotal fixing portions (12) of the auxiliary frame (5) are in a coaxial alignment with the upper supporting portions (7), thereby allowing the auxiliary frame (5) to be swingable toward and away from the front outer surface of the main frame (4).

A head rest stay (13) is formed as an elongated plate for supporting the main frame (4) and auxiliary frame (5). At the upper portion of the head rest stay (13), a first pivot point (A) is defined by a shaft member (14) having a pair of shafts (14a) projecting at the opposite end sides thereof, and a pair of pins (15) which fix the shafts (14a) to the head rest stay (13). Further, by means of welding technique or the like, to the uppermost end portion of the head rest stay (3), a fixed a "]"-shaped bracket (17) having a pair of shafts (16) projecting from the opposite end portions of bracket (17). A pair of collars (18) made of a synthetic resin or the like each having a threaded opening (22) are respectively fitted to the shafts (14a) which constitute the first fixed pivot point (A) of the head rest stay (13). The stay (13), having bracket (17), shaft member (14) and collars (18)

mounted thereon, is positioned in the interior of the main frame (4) through an opening formed at the bottom of the main frame (4). Clamping screws (21) are inserted into round holes (20) formed in the lower portions of two recessed portions (19) and threadingly fixed into the threaded openings (22) of the collars (18), respectively. In this way, the first pivot point (A) is defined in the main frame (4), whereupon the main frame (4) is pivotally fixed through such pivot point (A) to the head rest stay (13) so as to be inclinable with a given frictional resistance with respect to the stay (13).

A pair of arms (23) are each formed in a substantially ">" shape and are interlocked with the main frame (5) for causing the swinging movement of the auxiliary frame (5) in response to the inclination of the main frame (4) relative to the head rest stay (13). More specifically, each of the arms (23) has a shaft (24) projecting laterally, outwardly thereof, and further has a hole (25) formed at the bent portion thereof and an elongated hole (26) formed at the lower portion thereof. Rivet (27) is inserted through the hole (25) of the arm (23) and through the hole (9) of the supporting portion (8) so that both the holes (25) and (9) are aligned coaxially, thereby defining a second pivot point (B), whereupon the arm (23) is pivotally fixed through such pivot point (B) to the main frame (4) so as to be rotatable in a swinging manner about the second pivot point (B). Further, the shaft (24) of this arm (23) is inserted through the elongated hole (11) of the auxiliary frame (5) and the shaft (16) of the head rest stay (13) is inserted through the elongated hole (26) of the arm (23).

Figure 6:
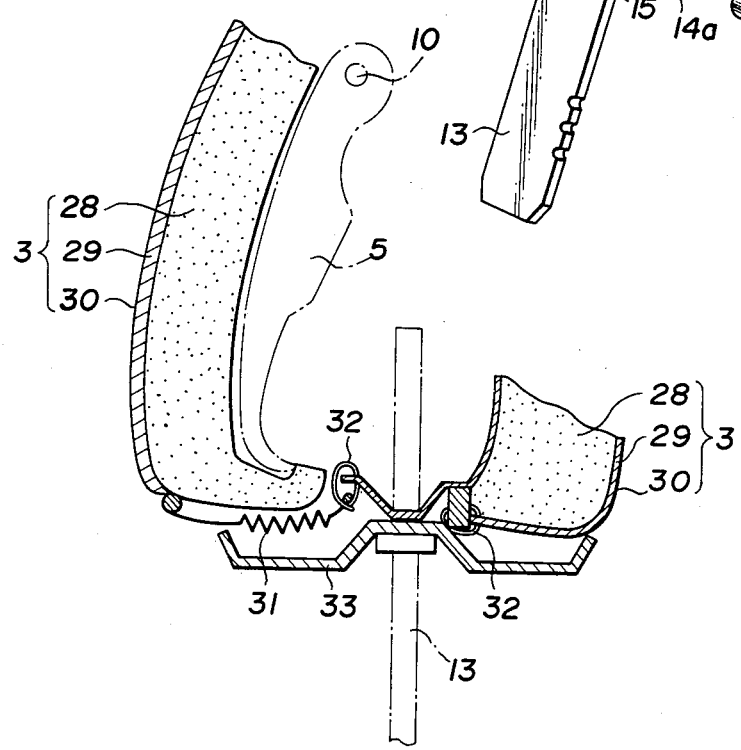
FIG. 6 is an enlarged side view of one part of the head rest unit shown in FIG. 2.

Upholstery (3) is mounted surrounding the main frame (4) and auxiliary frame (5) assembled as described above and shown in FIG. 6. This upholstery (3) comprises a top member (30), a wading member (29) layered under the top member (30) and a head rest pad (28) layered under the wading member (29). Since the auxiliary frame (5) pivots away from the main frame (4) of the head rest, the upholstery (3) is so arranged that a flexible webbing (31) is sewn at one end thereof to the edge of the lower portion of the upholstery and connected at the other end thereof to the frame of the head rest by means of hog ring (32) in order to keep the upholstery fixed to the auxiliary frame (5) even when the frame (5) pivots away from main frame (4). In addition, the under cover (33) of the head rest is designed to be of relatively large dimensions sufficient to hide the webbing (31) as well as the bottom portion of the head rest. This keeps the webbing (31) hidden from view and provides a more pleasing aesthetic appearance.

The mechanical action of the aforementioned head rest unit will be described.

As shown in FIG. 2, if the head rest (1) is manually inclined from the position indicated by the solid line to that indicated by the three-dotted line, then the head rest (1) is adjusted in its inclination by the angle $\theta_1$.

Now, to change the view, this operation is equal to that illustrated in FIG. 4, wherein the head rest stay (13) is shown to be rotated on the first pivot point (A) from the position indicated by the solid line to that indicated by the two-dotted line.

Accordingly, it will be seen in FIG. 4 that a response to such rotation of the head rest stay (13), the shaft (16) of the stay (13) is slidingly moved along the elongated hole (26) of the arm (23), causing the simultaneous rotation of the arm (23) about the second pivot point (B). In cooperation with such rotation of the arm (23), the shaft (24) of the arm (23) is slidingly moved along the elongated hole (11) of the auxiliary frame (5), causing the auxiliary frame (5) to pivot away from the main frame (4) to thereby raise the head contacting portion of the upholstery (3).

Referring now back to FIG. 2, it will be understood that the head contacting portion of the head rest (1) is raised to the position indicated by the two-dotted line (34) with the distance between the occupant's head and the head rest being changed to that indicated by the designation ($l_3$), and therefore the size of the contact area between the occupant's head and the head rest is maintained in an unvaried state.

Figure 7:
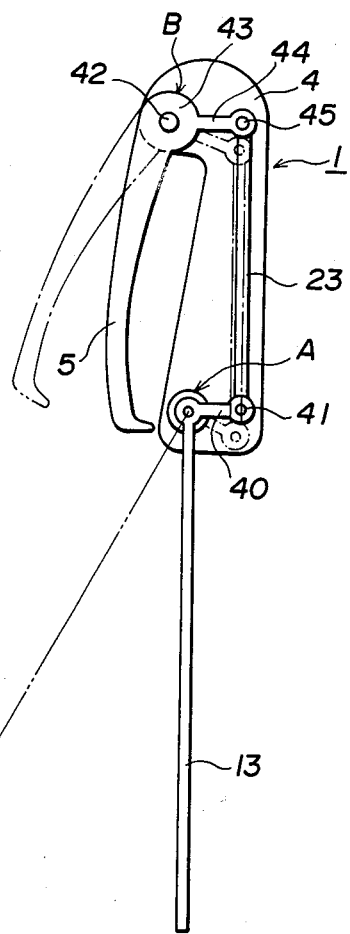
FIG. 7 is a side view showing the linking mechanism of another embodiment of the head rest unit according to the present invention.

With reference to FIG. 7, another embodiment of the present invention will now be described. In this embodiment, a four-joint linking mechanism is employed for causing the swinging movement of the auxiliary frame (5) in response to the inclination of the main frame (4).

According to this embodiment, the aforementioned first pivot point (a) is defined at the upper end portion of the head rest stay (13). The main frame (4) is pivotally fixed at this first pivot point (A) so as to be inclinable thereabout with a given frictional resistance. From such upper end portion of the stay (13), a support rod (40) extends laterally with respect to the stay, terminating in a bearing portion (41) to which one end of the arm (23) is pivotally fixed.

At the forward upper end portion of the main frame (4), the pivotally fixed portion (43) of the auxiliary frame (5) is positioned by being fixed through the insertion of a pin (42) thereinto, whereupon the aforementioned second pivot point (B) is defined at the pivotally fixed portion (43). Further, from the pivotally fixed portion (43), a support rod (44) extends laterally with respect to the auxiliary frame (5), terminating in a bearing portion to which the other end of the arm (23) is pivotally fixed.

In view of the above description, it is evident that the first and second pivot points (A) and (B) as well as the bearing portions (41) and (45) constitute four joints in this linking mechanism, thus providing a four-joint linking mechanism.

The components and structure not described except for the above-mentioned embodiment are identical to those as previously described referring to FIGS. 2 to 6, and need not be redescribed in detail.

Regarding the mechanical action of the embodiment shown in FIG. 7, the head rest (1) is manually inclinable forwardly as shown in FIG. 2. This mechanical action is equivalent to the head rest stay (13) being rotated about the first pivot point (A) from the position indicated by the solid line to that indicated by the two-dotted line. Accordingly, it will be seen that, as shown in the one-dotted line, the support rod (40) of the head rest stay (13) is rotated downwardly about the first pivot point (A), causing downward movement of the arm (23), and in response to such downward movement of the arm (23), the support rod (44) of the auxiliary frame (5) is rotated downwardly about the second pivot point (B), causing the auxiliary frame (5) to swing forwardly relative to the second pivot point (B) away from the main frame (4).

As described above hereinbefore, according to the present invention, when the head rest is adjusted in its inclination, the main frame thereof is inclined simultaneously, and in response to the inclination of the main frame, the auxiliary frame is swung toward or away from the main frame whereby the auxiliary frame is always maintained in a position to sufficiently support the head of an occupant, regardless of the inclination of the head rest. Accordingly, the contact area defined by the contact of the occupant's head with the head rest remains constant for various distances between the occupant's head and the head rest, thus providing the occupant with a feeling of comfortable support.

I claim:

1. A head rest unit for use with a vehicle seat, comprising:
   a head rest stay, the head rest stay being planar and being supportingly mounted on the vehicle seat, said head rest stay having an axis member mounted on the upper portion thereof and a bracket mounted on the uppermost end portion thereof, the axis member and bracket being situated on the head rest stay in spaced apart relationship, the axis member having an axis bar mounted thereon, the bracket having an axis pin mounted thereon;
   a main frame pivotally mounted on said axis bar of said axis member to allow the main frame to be inclinably positionable with respect to the head rest stay, said main frame having a front surface and a rear surface opposite the front surface, and an opening formed in the front surface thereof;
   friction means mounted on said main frame for providing the main frame with a given frictional resistance as the main frame moves inclinably with respect to the head rest stay;
   an auxiliary frame having a width which is larger than the width of said opening of said main frame, a portion of said auxiliary frame being movably mounted within said opening in such a manner that the upper part of said portion is pivotally mounted to said main frame, the auxiliary frame being pivotally mounted to the main frame at a pivot point which is continuously disposed on only one side of the plane in which the head rest stay resides as the main frame is inclinably positioned with respect to the stay; and
   a linking mechanism for causing said auxiliary frame to pivotally move toward and away from said main frame in response to the inclination of said main frame with respect to the head rest stay, said linking mechanism including arm means, said arm means being disposed adjacent to the bracket axis pin in such a manner that the lower part of said portion of said auxiliary frame is pivotally coupled to said arm means, wherein pivotable movement of the main frame causes the auxiliary frame to pivotlly move relative to the main frame to provide an unvarying contact area for supporting the head of the vehicle seat occupant.

2. The head rest unit in accordance with claim 1, wherein said arm means includes a shaft at one end portion thereof and an elongated hole formed in the opposing other end portion thereof, said arm means further including a bent portion which is pivotally mounted on said main frame, and wherein said auxiliary frame includes an elongated hole formed in said lower part thereof, whereby said shaft of said arm means is slidably inserted through said elongated hole of said auxiliary frame and said bracket axis pin is slidably inserted through said elongated hole of said arm means.

3. The head rest unit in accordance with claim 1, wherein said linking mechanism comprises a four joint linkage, the linkage including: a supporting lever, the supporting lever having two opposite ends, one lever end being fixedly joined to the head rest stay, the other lever end being pivotally joined to the arm means; and a holding lever pivotally joined to the arm means and fixedly joined to the auxiliary frame, wherein pivotal movement of the head rest stay causes the auxiliary frame to pivot with respect to the main frame.

* * * * *